US009762084B2

(12) United States Patent
Cho et al.

(10) Patent No.: US 9,762,084 B2
(45) Date of Patent: Sep. 12, 2017

(54) WIRELESS CHARGING SYSTEM AND METHOD FOR CONTROLLING THE SAME

(71) Applicant: Samsung Electro-Mechanics Co., Ltd., Suwon-Si (KR)

(72) Inventors: Sang Ho Cho, Suwon-Si (KR); Chang Ik Kim, Suwon-Si (KR); Seung Won Park, Suwon-Si (KR); Yong Woon Park, Suwon-Si (KR); Sang Beom Lee, Suwon-Si (KR); Eun Young Shin, Suwon-Si (KR); Jae Suk Sung, Suwon-Si (KR); Jae Hyoung Cho, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 127 days.

(21) Appl. No.: 14/715,856

(22) Filed: May 19, 2015

(65) Prior Publication Data
US 2016/0079794 A1    Mar. 17, 2016

(30) Foreign Application Priority Data
Sep. 11, 2014    (KR) .......................... 10-2014-0120393

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 50/12* (2016.02); *H02J 50/40* (2016.02); *H02J 3/28* (2013.01); *H02J 5/005* (2013.01); *H02J 7/00* (2013.01); *H02J 7/007* (2013.01); *H02J 7/042* (2013.01); *H02J 7/045* (2013.01); *H02J 50/00* (2016.02); *H02J 50/10* (2016.02); *H02J 50/80* (2016.02); *H02J 2007/0096* (2013.01)

(58) Field of Classification Search
CPC .. H02J 7/025; H02J 5/005; H02J 50/80; H02J 17/00; H02J 50/40; H02J 50/10; H02J 7/045; H02J 2007/0096; H02J 3/28; H02J 50/00; H02J 50/12; H02J 7/007; H02J 7/042
See application file for complete search history.

(56) References Cited

U.S. PATENT DOCUMENTS

| 5,796,334 A  * | 8/1998 | Chen ...................... G06K 1/128 |
| | | 307/10.7 |
| 7,880,337 B2 * | 2/2011 | Farkas .................. B60L 11/005 |
| | | 307/104 |

(Continued)

FOREIGN PATENT DOCUMENTS

KR    10-2013-0130191 A    12/2013

*Primary Examiner* — Helen Rossoshek
(74) *Attorney, Agent, or Firm* — NSIP Law

(57) ABSTRACT

There is provided a wireless charging system, including: a wireless power transmitting module including at least one power transmitter transmitting power and at least one wireless power receiving module receiving the power, wherein the wireless power transmitting module controls the power, which is transmitted to the wireless power receiving modules corresponding to the power transmitters, from the power transmitters, depending on targeted voltage gains of the wireless power receiving modules corresponding to the power transmitters.

16 Claims, 7 Drawing Sheets

(51) Int. Cl.
    *H02J 50/40*     (2016.01)
    *H02J 50/12*     (2016.01)
    *H02J 50/10*     (2016.01)
    *H02J 3/28*     (2006.01)
    *H02J 7/04*     (2006.01)
    *H02J 50/00*     (2016.01)
    *H02J 50/80*     (2016.01)
    *H02J 5/00*     (2016.01)

(56) References Cited

U.S. PATENT DOCUMENTS

| | | | | |
|---|---|---|---|---|
| 8,729,734 | B2 * | 5/2014 | Cook | H02J 5/005 307/104 |
| 9,071,085 | B2 * | 6/2015 | Kim | H02J 17/00 |
| 9,108,523 | B2 * | 8/2015 | Kim | H02J 5/005 |
| 9,437,362 | B2 * | 9/2016 | Kim | H01F 38/14 |
| 2012/0049644 | A1 * | 3/2012 | Choi | H02J 5/005 307/104 |
| 2012/0161539 | A1 * | 6/2012 | Kim | H02J 17/00 307/104 |
| 2012/0161696 | A1 * | 6/2012 | Cook | B60L 11/182 320/108 |
| 2012/0202435 | A1 * | 8/2012 | Kim | H04B 5/0037 455/69 |
| 2012/0242160 | A1 * | 9/2012 | Tseng | H04B 5/0037 307/104 |
| 2012/0244822 | A1 * | 9/2012 | Kim | H02J 5/005 455/90.1 |
| 2012/0280575 | A1 * | 11/2012 | Kim | H02J 17/00 307/104 |
| 2012/0288019 | A1 * | 11/2012 | Okamura | H02J 5/005 375/259 |
| 2013/0035034 | A1 * | 2/2013 | Kim | H04B 5/0037 455/41.1 |
| 2013/0062963 | A1 * | 3/2013 | Chernokalov | H02J 17/00 307/104 |
| 2013/0101133 | A1 * | 4/2013 | Yoon | H04R 3/12 381/77 |
| 2013/0162204 | A1 * | 6/2013 | Jung | H02J 17/00 320/108 |
| 2013/0249306 | A1 * | 9/2013 | Kim | H02J 17/00 307/104 |
| 2013/0300206 | A1 * | 11/2013 | Kim | H04B 5/0037 307/104 |
| 2014/0015331 | A1 * | 1/2014 | Kim | H01F 38/14 307/104 |
| 2014/0021796 | A1 * | 1/2014 | Song | H01F 38/14 307/104 |
| 2014/0070624 | A1 * | 3/2014 | Kim | H02J 5/005 307/104 |
| 2014/0070625 | A1 * | 3/2014 | Kim | H01F 38/14 307/104 |
| 2014/0125142 | A1 * | 5/2014 | Kanno | H02J 50/12 307/104 |
| 2014/0152251 | A1 * | 6/2014 | Kim | H02J 7/025 320/108 |
| 2014/0203657 | A1 * | 7/2014 | Song | H02J 50/12 307/104 |
| 2014/0266029 | A1 * | 9/2014 | Telefus | H02J 7/025 320/108 |
| 2014/0347008 | A1 * | 11/2014 | Chae | H02J 5/005 320/108 |
| 2014/0375256 | A1 * | 12/2014 | Lee | H02J 7/025 320/108 |
| 2015/0008753 | A1 * | 1/2015 | Park | H02J 5/005 307/104 |
| 2015/0076921 | A1 * | 3/2015 | Park | H02J 17/00 307/104 |
| 2015/0334723 | A1 * | 11/2015 | Kim | H02J 5/005 370/252 |
| 2016/0001665 | A1 * | 1/2016 | Kim | B60L 11/1809 320/109 |
| 2016/0056639 | A1 * | 2/2016 | Mao | H02J 50/80 307/104 |
| 2016/0087451 | A1 * | 3/2016 | Nam | H04W 88/02 307/104 |
| 2016/0181855 | A1 * | 6/2016 | Muurinen | H02J 7/025 320/108 |
| 2016/0285278 | A1 * | 9/2016 | Mehas | H02J 50/12 |

\* cited by examiner

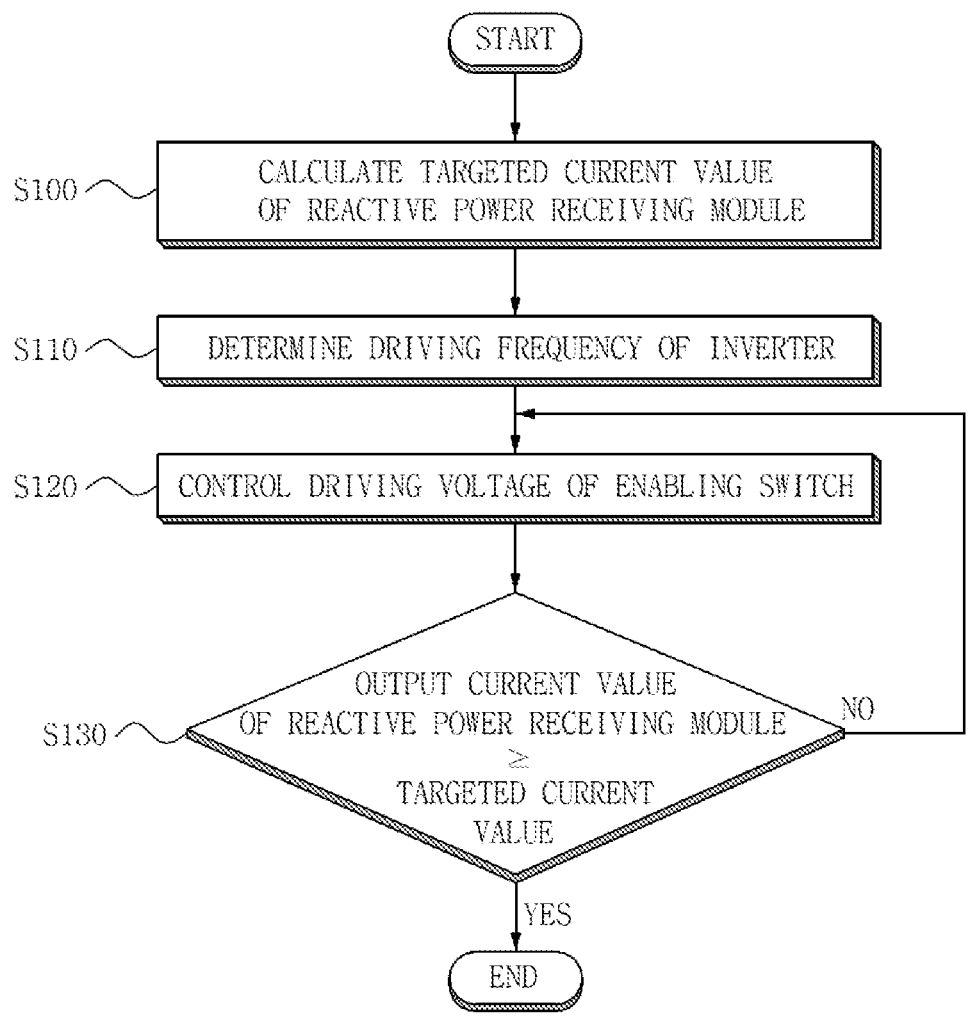

WIRELESS CHARGING SYSTEM AND METHOD FOR CONTROLLING THE SAME

CROSS-REFERENCE TO RELATED APPLICATION

This application claims the benefit of Korean Patent Application No. 10-2014-0120393, filed on Sep. 11, 2014, entitled "Wireless Charging System And Method For Controlling The Same" which is hereby incorporated by reference in its entirety into this application.

BACKGROUND

The present disclosure relates to a wireless charging system and a method for controlling the same.

In recent years, a wireless power transfer technology which is a method for conveniently supplying or charging power to various kinds of electronic devices without a connection of an electric wire has been actively researched, and thus an interest in the wireless power transfer technology has been suddenly increased. A field of the wireless power transfer technology tends to be expanded from a method of wirelessly charging a personal terminal to a technology of wirelessly charging a battery for a vehicle.

The field of the wireless power transfer technology largely uses an inductive coupling method, an evanescent wave resonance method, a radio frequency (RF) method, and the like. Among those, the currently most efficient and widely used method is the inductive coupling method.

A principle of the inductive coupling method is the same as a basic principle of a transformer. In the wireless charging system, a primary coil and a secondary coil of the transformer are separated from each other and thus the primary coil is equipped in a charging apparatus (hereinafter, transmitting apparatus) and the secondary coil (hereinafter, receiving apparatus) is equipped in a terminal.

In designing the wireless charging system using the inductive coupling method, a current induction between the coils is closely connected with the entire system efficiency and therefore there is a need to design the wireless charging system in consideration of characteristics and matching of coils of transmitting and receiving ends.

Recently, various consumer demands for the wireless charging technology have mainly focused on multiple charging by which a single wireless charging transmitter may charge a plurality of wireless charging receivers. Therefore, many technologies for realizing the multiple charging have been suggested recently.

RELATED ART DOCUMENT

Patent Document (Patent Document 1) Korean Patent Laid-Open Publication No. 2013-0130191KR

SUMMARY

An aspect of the present disclosure may solve an incompatibility problem between a wireless power transmitter using a method for driving a plurality of inductors with a single inverter for multiple charging and a wireless power receiver using a method for driving a plurality of inductors with each inverter for multiple charging.

According to a wireless charging system and a method for controlling the same according to an exemplary embodiment of the present disclosure, for compatibility between a wireless power transmitting module using a method for driving a plurality of inductors with a single inverter, not with each inverter, for multiple charging and a wireless power receiving module using a method for driving a plurality of inductors with each inverter for multiple charging for a plurality of wireless power receivers, a voltage of a resonance tank is controlled by controlling a magnitude of a driving voltage of an enabling switch based on a targeted current value of the wireless power receiving module corresponding to a power transmitter included in the wireless power transmitting module.

Further, a frequency of a driving signal of the inverter may be determined depending on targeted voltage gains of the wireless power receiving module corresponding to the power transmitter and a voltage of the resonance tank may be controlled based on the driving frequency.

That is, a maximum voltage gain among the targeted voltage gains of the wireless power receiving module corresponding to the power transmitter may be detected and the frequency of the driving signal for controlling the switching operation of the inverter based on the maximum voltage gain may be determined.

Therefore, the power transmitter may include an enabling switch enabling the resonance tank by a switching operation, the resonance tank may be configured to include the transmitting inductor and the transmitting capacitor which are connected to each other in series, and the enabling switch may be a metal oxide semiconductor field effect transistor (MOSFET).

BRIEF DESCRIPTION OF DRAWINGS

The above and other aspects, features and other advantages of the present disclosure will be more clearly understood from the following detailed description taken in conjunction with the accompanying drawings, in which:

FIG. 7 is a flow chart illustrating a method for controlling a wireless charging system according to an exemplary embodiment of the present disclosure.

DETAILED DESCRIPTION

Figure 1:
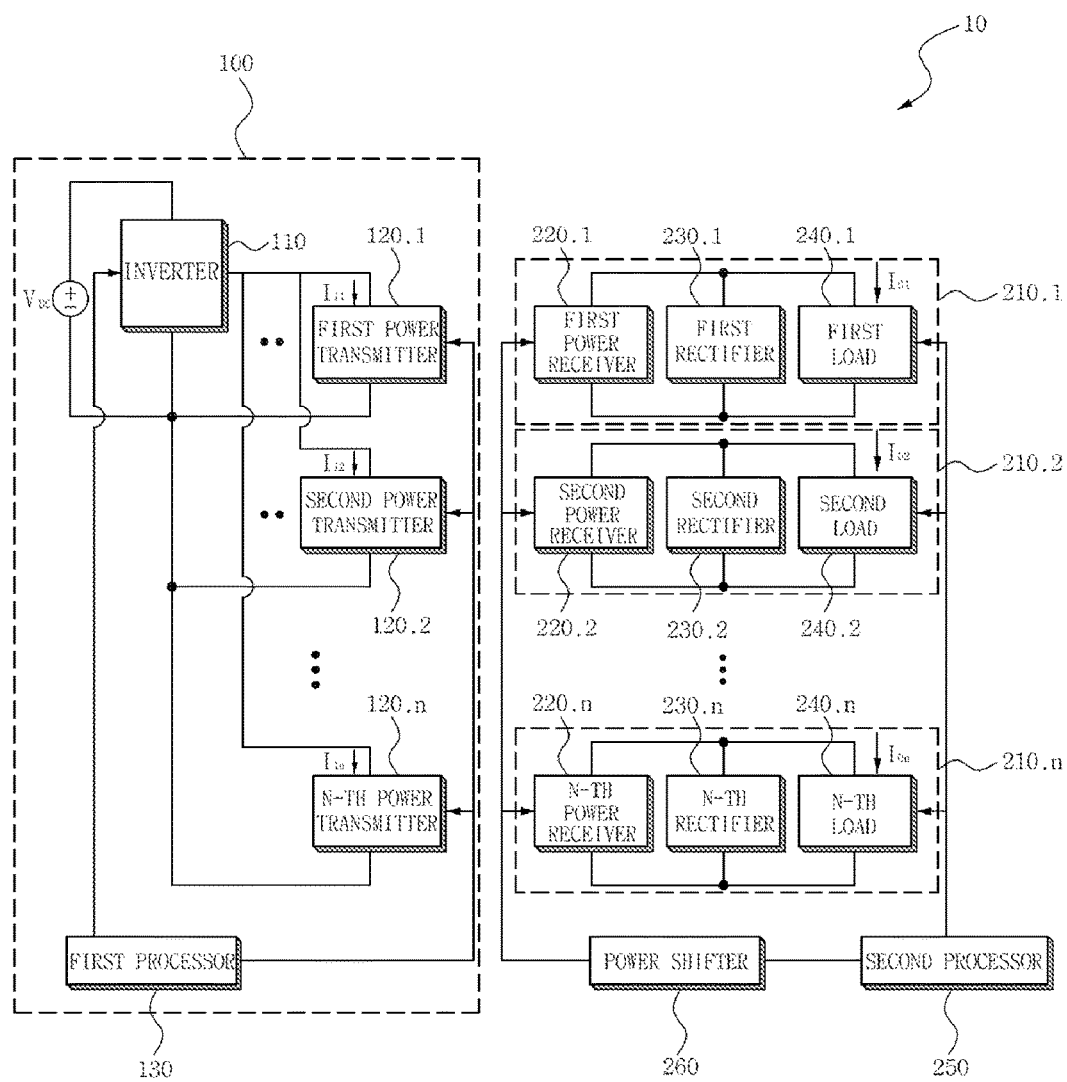
FIG. 1 is a block diagram illustrating a wireless charging system according to an exemplary embodiment of the present disclosure.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings.

Hereinafter, a wireless charging system and a method for controlling the same according to exemplary embodiments of the present disclosure will be described in detail with reference to the accompanying drawings.

Figure 2:
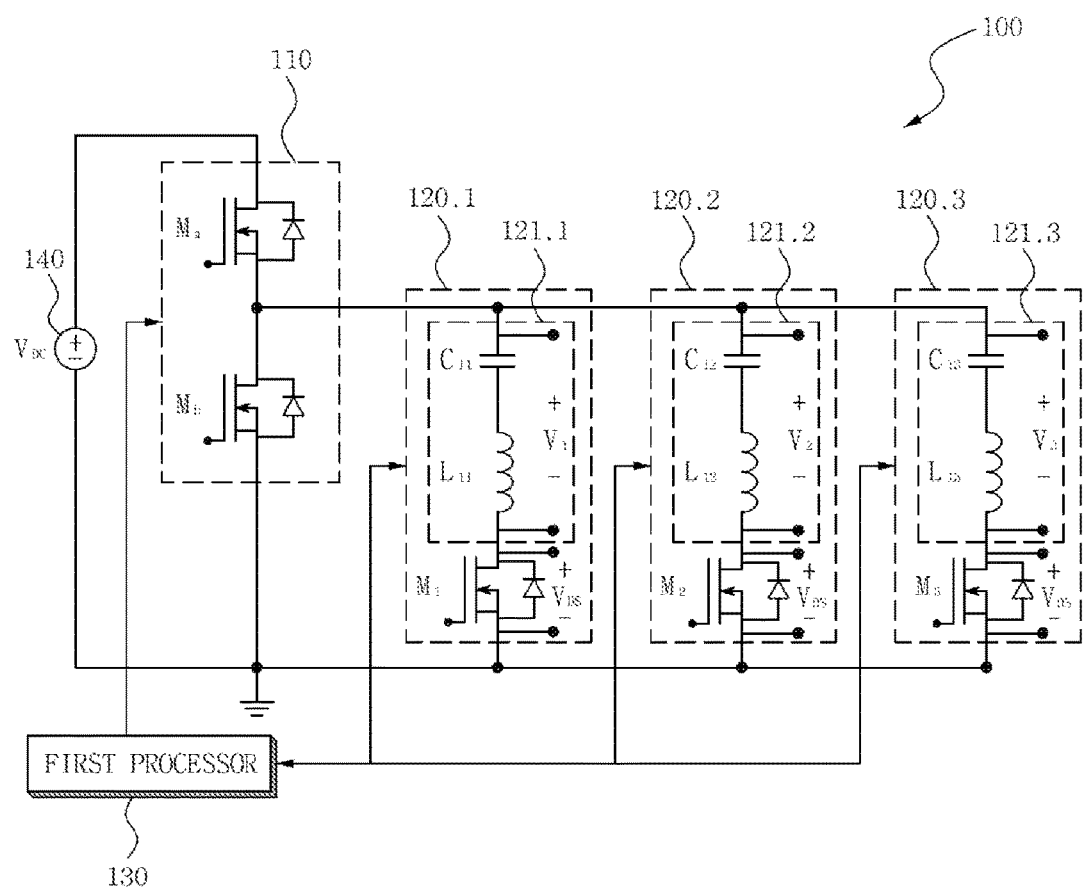
FIG. 2 is a diagram illustrating a configuration of a wireless charging transmitting module of the wireless charging system according to the exemplary embodiment of the present disclosure.
Figure 3:
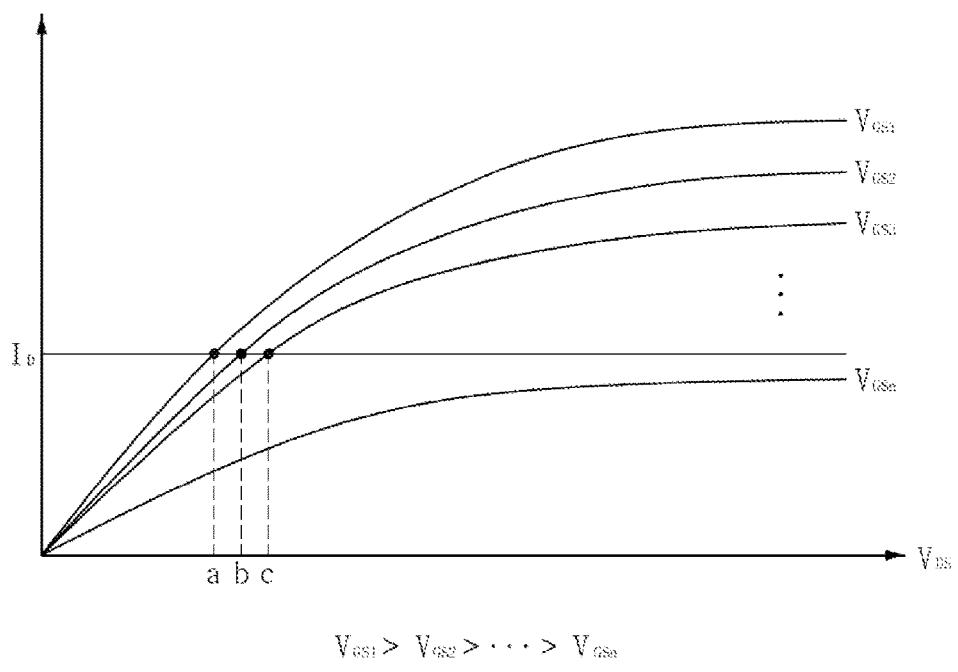
FIG. 3 is a diagram illustrating a relationship between a driving voltage and an output voltage of a MOSFET which is an enabling switch of a power transmitter according to an exemplary embodiment of the present disclosure.

FIG. 1 is a block diagram illustrating a wireless charging system according to an exemplary embodiment of the present disclosure, FIG. 2 is a diagram illustrating a configuration of a wireless charging transmitting module of the wireless charging system according to the exemplary embodiment of the present disclosure, and FIG. 3 is a diagram illustrating a relationship between a driving voltage and an output voltage of a MOSFET which is an enabling switch of a power transmitter according to an exemplary embodiment of the present disclosure.

As illustrated in FIGS. 1 and 2, a wireless charging system 10 according to an exemplary embodiment of the present disclosure includes a wireless power transmitting module 100 which includes at least one power transmitter 120.1 to 120.n transmitting power and at least one wireless power receiving module 210.1 to 210.n which receives the power.

The wireless power transmitting module 100 controls power, which is transmitted to the wireless power receiving modules 210.1 to 210.n corresponding to the power transmitters 120.1 to 120.n, from the power transmitters 120.1 to 120.n, depending on targeted voltage gains of the wireless power receiving modules 210.1 to 210.n corresponding to the power transmitters 120.1 to 120.n and may include an inverter 110, the at least one power transmitter 120.1 to 120.n and a first processor 130.

The inverter 110 changes a DC voltage applied from a power source module 140 to a pulse voltage signal (square pulse) by a switching operation and applies the pulse voltage signal (square pulse) to the power transmitters 120.1 to 120.n. Further, the inverter 110 includes a first switch Ma and a second switch Mb which are electrically connected to each other and are alternately operated, in which the second switch Mb is connected to the power transmitters 120.1 to 120.n in parallel. In this configuration, the first switch Ma and the second switch Mb may be a metal oxide semiconductor field effect transistor (MOSFET) and may be selected from an n-type MOSFET and a p-type MOSFET and a detailed content thereof will be described below.

As illustrated in FIGS. 1 and 2, the power transmitters 120.1 to 120.n transmit power to the wireless power receiving modules 210.1 to 210.n based on the pulse voltage signal applied from the inverter 110 and include resonance tanks 121.1 to 121.n configured to include transmitting inductors $L_{11}$ to $L_{1n}$ and transmitting capacitors $C_{11}$ to $C_{1N}$ which are connected to each other in series and enabling switches $M_1$ to $M_n$ enabling the resonance tanks 121.1 to 121n by the switching operation. Further, at least on power transmitters 120.1 to 120.n may be provided in the wireless power transmitting module 100 and the respective power transmitters 120.1 to 120.n are connected to each other in parallel.

In this configuration, the enabling switches $M_1$ to $M_n$ may be a metal oxide semiconductor field effect transistor and may be selected from an n-type MOSFET and a p-type MOSFET and the enabling switches $M_1$ to $M_n$ are operated in a switching area or a linear area depending on a magnitude of a driving voltage (gate-source voltage).

That is, as illustrated in FIG. 3,1) the linear area means an area in which a drain-source voltage $V_{DS}$ is reduced when a gate-source voltage $V_{GS}$ is increased based on the same drain current $I_D$, in the case in which the enabling switches $M_1$ to $M_n$ are an n-type MOSFET and 2) the switching area means an operation area when the drain-source voltage $V_{DS}$ is converged to 0 [V], in the case in which the gate-source voltage $V_{GS}$ is increased. In this case, a resistance between drain-source terminals approaches 0 [Ω].

Here, the drain current $I_D$ is the same as a current flowing in the transmitting inductors $L_{11}$ to $L_{1n}$ and the drain-source voltage $V_{DS}$ is also increased when the gate-source voltage $V_{GS}$ is increased, in the case in which the enabling switches $M_1$ to $M_n$ are the p-type MOSFET.

Further, to increase efficiency of power transfer from the power transmitters 120.1 to 120.n to the wireless charging receiving modules 210.1 to 210.n, a resonance frequency of the transmitting inductors $L_{11}$ to $L_{1n}$ and the transmitting capacitors $C_{11}$ to $C_{1N}$ may be set to be same as a resonance frequency of receiving inductors $L_{21}$ to $L_{2n}$ and receiving capacitors $C_{21}$ to $C_{2N}$ of the wireless charging receiving module.

The first processor 130 controls power transmitted from the power transmitters 120.1 to 120.n to the wireless power receiving modules 210.1 to 210.n, depending on the targeted voltage gains of the wireless power receiving modules 210.1 to 210.n corresponding to the power transmitters 120.1 to 120.n.

That is, the first processor 130 controls the voltage of the resonance tanks 121.1 to 121.n included in the power transmitters 120.1 to 120.n depending on the targeted voltage gains of the wireless power receiving modules 210.1 to 210.n corresponding to the power transmitters 120.1 to 120.n, thereby controlling the power transmitted to the wireless power receiving modules 210.1 to 210.n.

In more detail, as illustrated in FIGS. 1 and 2, the first processor 130 controls a voltage $V_1$ to $V_n$ of the resonance tanks 121.1 to 121.n included in the power transmitters 120.1 to 120.n depending on the targeted voltage gains of the wireless power receiving modules 210.1 to 210.n corresponding to the respective power transmitters 120.1 to 120.n to transfer power corresponding to the targeted voltage gains, thereby controlling the magnitude of the current $I_{11}$ to $I_{1n}$ flowing in the transmitting inductors of the resonance tanks 121.1, 121.2, and 121.3 to 121.n.

In this configuration, the first processor 130 controls the magnitude of the gate-source voltage $V_{GS}$ of the enabling switches $M_1$ to $M_n$ (MOSFET) which are connected to the resonance tanks 121.1 to 121.n in series depending on the targeted voltage gains of the wireless power receiving modules 210.1 to 210.n corresponding to the respective power transmitters 120.1 to 120.n to control the magnitude of the drain-source voltage $V_{DS}$, thereby controlling the voltage of the resonance tanks $V_1$ to $V_n$.

Therefore, the magnitude of the current $I_{11}$ to $I_{1n}$ flowing in the transmitting inductors $L_{11}$ to $L_{1n}$ determined by the voltage of the resonance tanks 121.1 to 121.n may be controlled. Further, a counter electromotive force is induced to the receiving inductors $L_{21}$ to $L_{2n}$ of the wireless power receiving modules 210.1 to 210.n by a magnetic field induced by the current $I_{11}$ to $I_{1n}$ and the induction current (output current) is generated in the receiving inductors 210.1 to 210.n by the counter electromotive force. As a result, power may wirelessly transferred from the current transmitters 120.1 to 120.n to the wireless power receiving modules 210.1 to 210.n by an inductive coupling method.

Further, the first processor 130 determines the frequency of the driving signal of the inverter 110 depending on the targeted voltage gains of the wireless power receiving modules 210.1 to 210.n corresponding to the power transmitters 120.1 to 120.n, thereby controlling the switching operation of the first switch Ma and the second switch Mb of the inverter 110 based on the driving frequency.

That is, the first processor 130 calculates the maximum voltage gain among the targeted voltage gains of the wireless power receiving modules 210.1 to 210.n corresponding to the power transmitters 120.1 to 120.n and then determines the frequency of the PWM signals of the first and second switches Ma and Mb of the inverter 110 required to transfer the maximum voltage gain to the wireless power receiving modules 210.1 to 210.n. Here, a duty ratio of the PWM signal is 50%.

Figure 4:
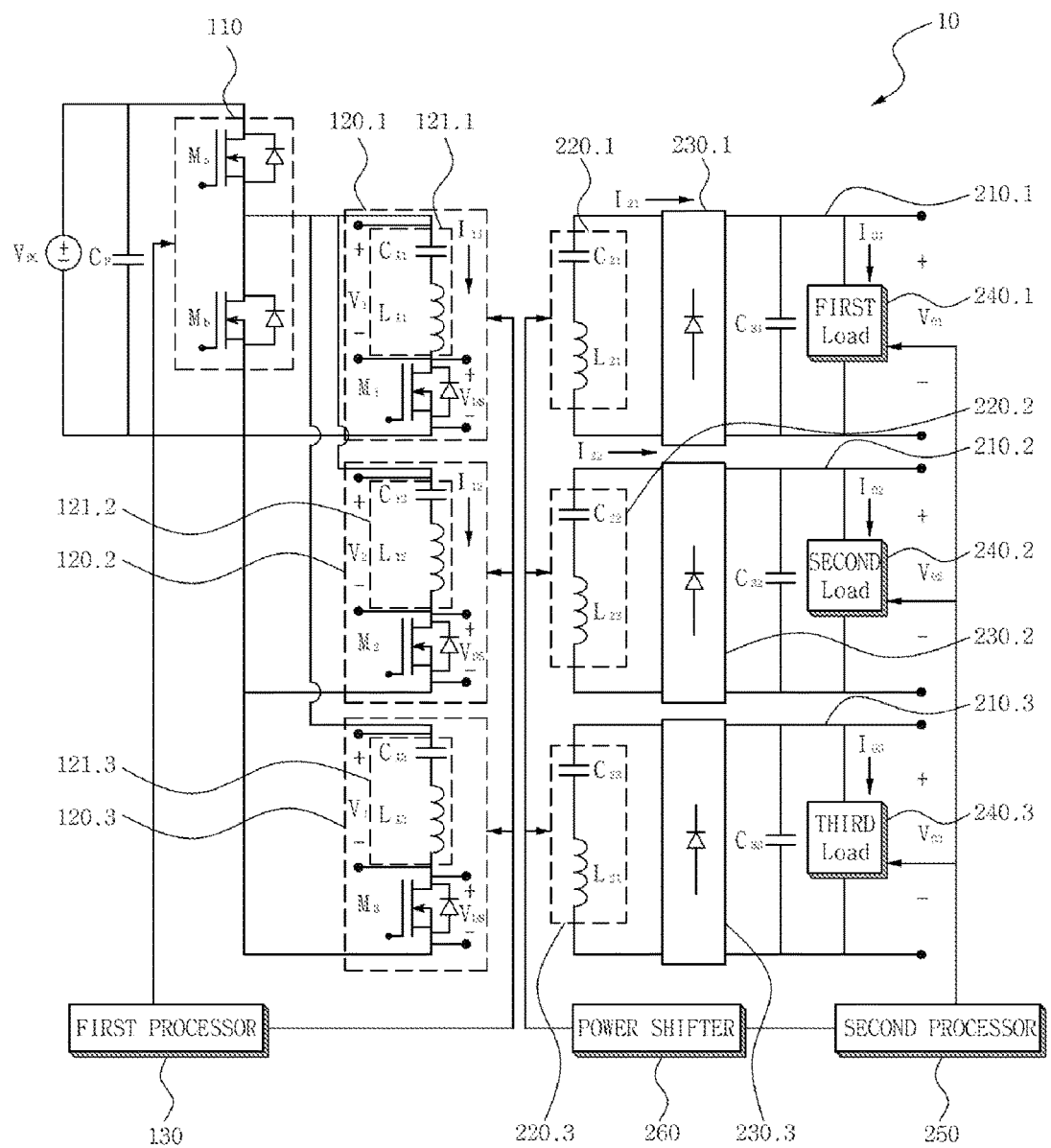
FIG. 4 is a diagram illustrating a circuit configuration of the wireless charging system according to the exemplary embodiment of the present disclosure.

For example, as illustrated in FIG. 4, in the case in which the targeted voltage gains of the first to third wireless power receiving modules 210.1 to 210.3 each are 1 [A], 0.8 [A], and 0.6 [A], when the driving frequency (frequency of the PWM signal) of the inverter 110 for controlling the targeted voltage gains, respectively, is 130 [kz], 150 [kz], and 170 [kz], 130 [kz] corresponding to 1 [A] which is the maximum voltage gain among the output voltage gains is determined as the driving frequency of the inverter 110 and thus the first and second switches Ma and Mb of the inverter 110 are operated based on the driving frequency.

Therefore, the driving frequency of the inverter is controlled depending on the targeted voltage gain of the wireless power receiving module corresponding to the power transmitter to reduce a power loss which may occur while the inverter is operated at the maximum gain point all the times, thereby increasing the power transmission efficiency of the wireless charging system.

The wireless power receiving modules 210.1 to 210.n may be an object to be charged such as a portable terminal receiving the power transmitted from the wireless power transmitting module 100 corresponding to the wireless power receiving modules 210.1 to 210.n and when the charging is required, the wireless power receiving modules 210.1 to 210.n contact the wireless power transmitting module 100 and are supplied with the power from the wireless power transmitting module 100 from that time.

Further, the wireless power receiving modules 210.1 to 210.n may include the power receivers 220.1 to 220.n supplied with the power from the power transmitters 120.1 to 120.n of the wireless power transmitting module 100 and rectifiers 230.1 to 230.n rectifying the voltage or the current received through the power receivers 220.1 to 220.n into a DC current and supplying the DC current to loads 240.1 to 240.n. Here, the loads 240.1 to 240.n may be a battery included in the portable terminal, and the like, but the present disclosure is not limited thereto.

Further, the wireless power receiving modules 210.1 to 210.n include a second processor 250 detecting the targeted voltage gains of the wireless power receiving modules 210.1 to 210.n required for the loads 240.1 to 240.n and a power shifter 260 shifting the current or the voltage induced to the power receivers 220.1 to 220.n depending on the targeted voltage gains detected by the second processor 250. In this configuration, the power shifter 260 may include a capacitor (not illustrated) and a switch (not illustrated) or a resistor (not illustrated) and a switch (not illustrated), in which the switch (not illustrated) may be a MOSFET.

For example, as illustrated in FIG. 1, the second processor 250 confirms a voltage charging state of a second load 240.2 for the second wireless power receiving module 210.2 to detect the required targeted voltage gain of the second wireless power receiving module 210.2 and then apply a control signal to the power shifter 260 so as to supply the targeted voltage gain to the load 240.2.

The power shifter 260 shifts the current or the voltage of the second power receiver 220.2 depending on the control signal. Therefore, the current of the second power transmitter 120.2 corresponding to the second power receiver 220.2 is shifted and the first processor 130 senses a change in current flowing in the second power transmitter 120.2 to determine whether to increase or reduce the current or the voltage to be supplied to the second power receiver 220.2.

Here, the current flowing in the power receivers 220.1 to 220.n induced by the current $I_{11}$ to $I_{1n}$ flowing in the power transmitters 120.1 to 120.n is determined depending on a turn ratio between the transmitting inductors $L_{11}$ to $L_{1n}$ and the receiving inductors $L_{21}$ to $L_{2n}$.

As reviewed above, the wireless charging system according to the exemplary embodiment of the present disclosure drives the plurality of power transmitters with a single inverter for charging the plurality of wireless power receiving modules with a single wireless power transmitting module and individually controls the transmission power of the power transmitter corresponding to the wireless power receiving modules depending on the output voltage gains of the respective wireless power receiving modules, thereby simplifying the circuit configuration for the multiple wireless charging and securing the compatibility with the existing wireless power receiver.

Further, the driving frequency of the inverter is controlled depending on the output current of the wireless power receiving module corresponding to the power transmitter to reduce the power loss which may occur while the inverter is operated at the maximum gain point all the times, thereby increasing the power transmission efficiency of the wireless charging system.

Hereinafter, a method for controlling a wireless charging system according to an exemplary embodiment of the present disclosure will be described in more detail with reference to FIGS. 4 to 6B, in which the case in which the wireless power transmitting module includes three power transmitters will be described but the number of power transmitters is not limited thereto.

Figure 5A:
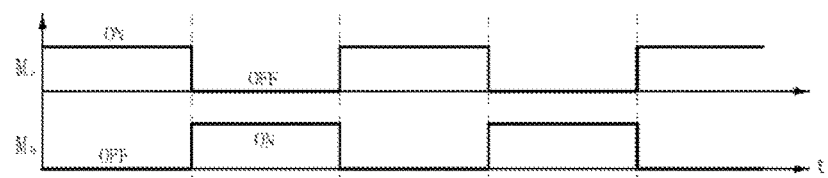
FIG. 5A is a diagram illustrating an operation signal of an inverter according to an exemplary embodiment of the present disclosure.
Figure 5B:
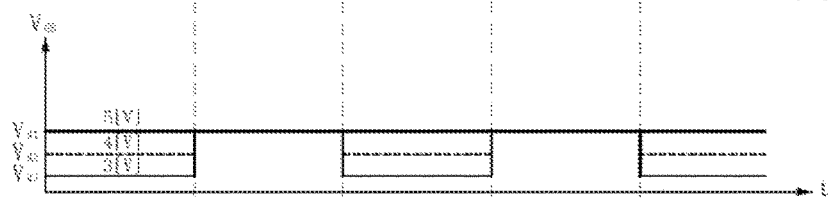
FIG. 5B is a diagram illustrating a driving voltage of the enabling switch of the power transmitter.
Figure 5C:
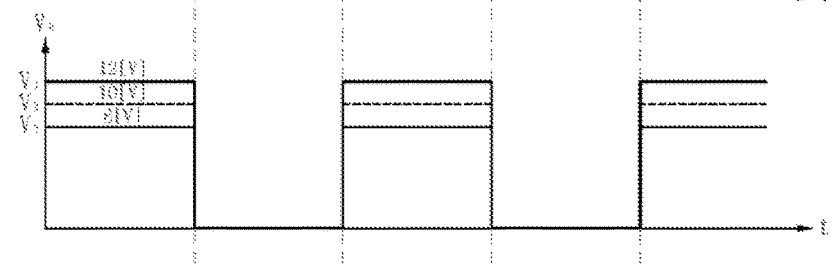
FIG. 5C is a diagram illustrating a voltage of a resonance tank of the power transmitter.

FIG. 4 is a diagram illustrating a circuit configuration of the wireless charging system according to the exemplary embodiment of the present disclosure. FIG. 5A is a diagram illustrating an operation signal of an inverter according to an exemplary embodiment of the present disclosure, FIG. 5B is a diagram illustrating a driving voltage of the enabling switch of the power transmitter, and FIG. 5C is a diagram illustrating a voltage of a resonance tank of the power transmitter.

Figure 6A:
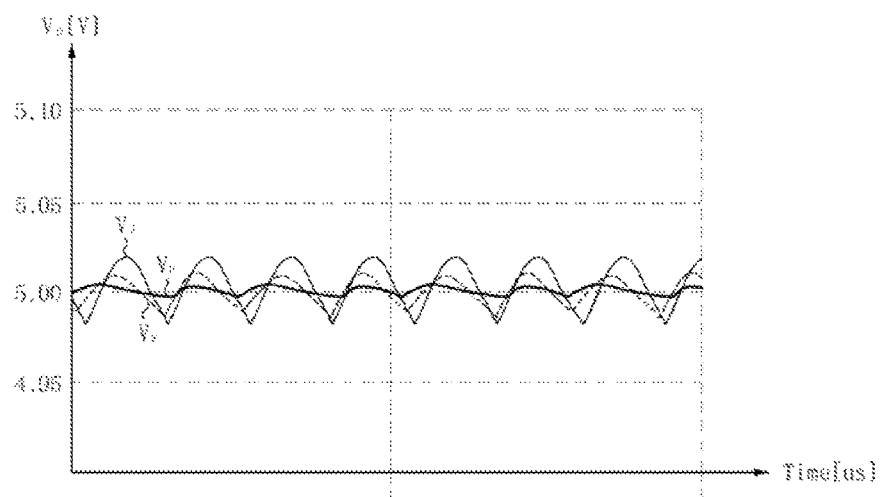
FIG. 6A and FIG. 6B are diagrams illustrating an output voltage of a wireless charging receiving module and an output current of the wireless charging receiving module according to the exemplary embodiment of the present disclosure illustrated in FIGS. 5A to 5C.
Figure 6B:
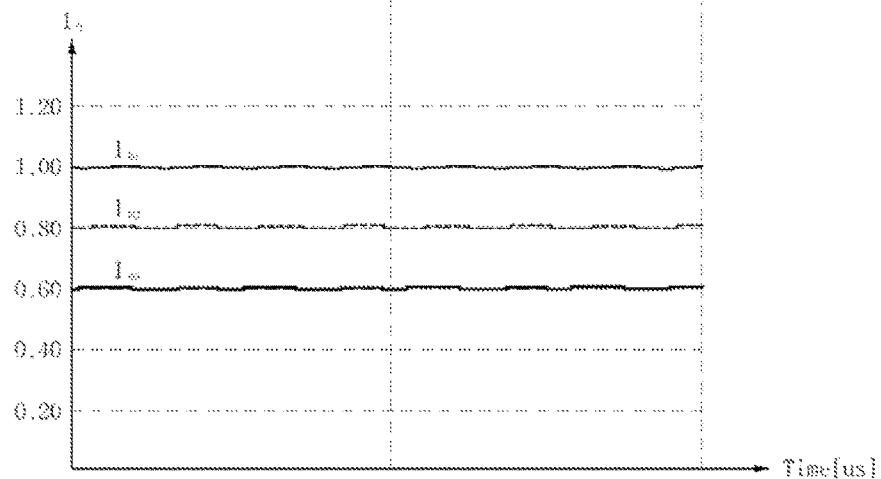

FIGS. 6A and 6B are diagrams illustrating a load voltage of a wireless power receiving module and an output current of the wireless power receiving module according to the exemplary embodiment of the present disclosure illustrated in FIGS. 5A-5C and FIG. 7 is a flow chart illustrating a method for controlling a wireless charging system according to an exemplary embodiment of the present disclosure.

Hereinafter, the case in which the first to third wireless power receiving modules 210.1 to 210.3 each correspond to the first to third power transmitters included in the wireless power transmitting module will be described but is only one exemplary embodiment and therefore the number of power transmitters and the number of wireless power receiving modules are not limited thereto.

As illustrated in FIGS. 4 and 7, first, the second processor 250 performs a targeted current detecting step of detecting the targeted voltage gains of each of the wireless power receiving modules 210.1 to 210.n corresponding to the power transmitters included in the wireless power transmitting modules 100 (S100).

For example, as illustrated in FIG. 4, the second processor 250 calculates a magnitude (targeted voltage gain) of current required to allow the loads 240.1 to 240.3 to be charged up to a predetermined voltage (for example, 5 [V]) depending on the voltage charging state of the first to third loads 240.1 to 240.3 of the first to third wireless power receiving modules 210.1 to 210.3 corresponding to the first to third power transmitters 120.1 to 120.3.

Here, the second processor 250 may transmit information on the targeted voltage gains of the first to third wireless power receiving modules 210.1 to 210.3 to the first processor 130 through a separate communication channel (not illustrated), but the exemplary embodiment of the present disclosure is not limited thereto.

Next, the first processor 130 performs a transmitting power control step of controlling power transmitted from the respective power transmitters 120.1 to 120.3 to the wireless power receiving modules 210.1 to 210.3 corresponding to the power transmitters 120.1 to 120.3 depending on the targeted voltage gains.

In detail, 1) the step of determining the frequency of the driving signal of the inverter 110 depending on the targeted voltage gains of the first to third wireless power receiving modules 210.1 to 210.3 corresponding to the first to third power transmitters 120.1 to 120.3 is performed (S110).

That is, the maximum voltage gain among the targeted voltage gains of the first to third wireless power receiving modules 210.1 to 210.3 corresponding to the first to third power transmitters 120.1 to 120.3 is calculated and the frequency of the driving signal for controlling the operation of the first switch Ma and the second switch Mb of the inverter 110 is determined depending on the maximum voltage gain.

Here, the first switch Ma and the second switch Mb of the inverter 110 may be a metal oxide semiconductor field effect transistor (MOSFET) and the driving signal may be a pulse width modulation (PWM) signal for operating the MOSFET.

For example, when each of the targeted voltage gains of the first to third wireless power receiving modules 210.1 to 210.3 is 1 [A], 0.8 [A], and 0.6 [A], it is assumed that the driving frequency (frequency of the PWM signal) of the inverter 110 for providing the current is 130 [kz], 150 [kz], and 170 [kz].

The first processor 130 determines 130 [kz] corresponding to 1 [A] which is the maximum voltage gain among the targeted voltage gains as the driving frequency of the inverter 110 to operate the first and second switches Ma and Mb of the inverter 110 based on the driving frequency.

That is, as illustrated in FIG. 5A, the inverter 110 alternately operates the turn on of the first switch Ma and the second switch Mb by the PWM signal set as the driving frequency based on the targeted voltage gains of the wireless power receiving modules 210.1 to 210.3.

Further, the inverter 110 changes the DC voltage applied from the power source module 140 to the pulse voltage signal (square wave) by the switching operation and applies the pulse voltage signal (square wave) to the first to third power transmitters 120.1 to 120.3.

3) Next, the first processor 130 performs a step of controlling the driving voltage of the enabling switches $M_1$ to $M_3$ included in each power transmitters 120.1 to 120.3 depending on the targeted voltage gains of the wireless power receiving modules 210.1 to 210.3 corresponding to the power transmitters 120.1 to 120.3 (S120).

For example, as illustrated in FIGS. 4 and 5A-5C, in the case in which each of the targeted voltage gains required for the first to third wireless power receiving modules 210.1 to 210.3 is 1 [A], 0.8 [A], and 0.6 [A], i) when the first switch Ma of the inverter 110 is turned on and the second switch Mb is turned off, the first processor 130 controls the magnitude of the driving voltage (gate-source voltage) of the first to third enabling switches $M_1$ to $M_3$ to be 5 [V], 4[V], and 3 [V], respectively, and thus the magnitude of the output voltage (drain-source voltage) of the first to third enabling switches $M_1$ to $M_3$ is set to be 0 [V], 2 [V], and 4 [V], respectively.

Here, the output voltage (drain-source voltage) of the first enabling switch $M_1$ is converged to 0 [V] and thus the first enabling switch $M_1$ is turned on in a switching area and the second enabling switch $M_2$ and the third enabling switch $M_3$ are operated in a linear area.

In this case, when the input voltage applied from the inverter 110 is 12 [V], the first to third resonance tanks 121.1 to 121.3 included in the first to third power transmitters 120.1 to 120.3 are each applied with a voltage having a magnitude of 12 [V], 10 [V], and 8 [V].

Therefore, the current $I_{11}$ to $I_{13}$ corresponding to the magnitude of voltage of the resonance tank flows in the first to third transmitting inductors $L_{11}$ to $L_{13}$ and the current $I_{21}$ to $I_{23}$ generated by the counter electromotive force is induced to the first to third receiving inductors $L_{21}$ to $L_{23}$ by the induction magnetic field of the current.

ii) When the first switch Ma of the inverter 110 is turned off and the second switch Mb is turned on, all the first to third enabling switches $M_1$ to $M_3$ are turned on in the switching area. That is, the driving voltage (gate-source voltage) of the first to third enabling switches $M_1$ to $M_3$ is controlled to allow the output voltage (drain-source voltage) be converged to 0 [V].

4) Finally, the second processor 250 determines whether the targeted voltage gains of the first to third wireless power receiving modules 210.1 to 210.3 are converged to the targeted voltage gains of the respective wireless power receiving modules (S130).

That is, the second processor 250 shifts the current or the voltage induced to the power receivers 220.1 to 220.3 using the power shifter 260 when output voltage gains $I_{O1}$ to $I_{O3}$ of the first to third wireless power receiving modules 210.1 to 210.3 are different from the targeted voltage gains to change the current of the first to third power transmitters 120.1 to 120.3 corresponding to the first to third power receivers 220.1 to 220.3.

In this case, the first processor 130 senses the change in current of the first to third power transmitters 120.1 to 120.3 to control the driving voltage (gate-source voltage) of the enabling switches $M_1$ to $M_3$ included in the power transmitters 120.1 to 120.3 so as to increase or reduce the magnitude of voltage of the first to third resonance tanks, thereby controlling the output voltage gains of the first to third wireless power receiving modules 210.1 to 210.3 to be converged to the targeted voltage gains.

Therefore, as illustrated in FIGS. 6A-6B, when the voltage of the first to third resonance tanks 121.1 to 121.3 is controlled to be 12 [V], 10 [V], and 8 [V], respectively, by controlling the driving voltage (gate-source voltage) of the first to third enabling switches $M_1$ to $M_3$, the output current $I_{O1}$ to $I_{O3}$ of the first to third wireless power receiving modules is each converged to 1 [A], 0.8 [A], and 0.6 [A] (FIG. 6B).

Further, the driving voltage (gate-source voltage) of the first to third enabling switches $M_1$ to $M_3$ is controlled to precisely control the voltage $V_{O1}$, $V_{O2}$, and $V_{O3}$ of the first to third loads 240.1 to 240.3 to be converged to the predetermined voltage (for example, 5 [V]) independent of the output load (FIG. 5A).

As described above, the first processor 130 and the second processor 250 may include an algorithm for performing the above-mentioned functions and may be implemented as firmware, software, or hardware (for example, a semiconductor chip or an application-specific integrated circuit).

As set forth above, according to the exemplary embodiments of the present disclosure, it is possible to control the voltage of the resonance tank by controlling the magnitude of the driving voltage of the enabling switch depending on the targeted voltage gain of the wireless power receiving module corresponding to the power transmitter.

Further, the first and second switches of the inverter may be the metal oxide semiconductor field effect transistor and the frequency of the PWM signal for controlling the operation of the first and second switches of the inverter may be determined based on the maximum voltage gain in the output current of the wireless power receiving module corresponding to the power transmitter.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. A wireless charging system, comprising:
an inverter changing a DC voltage applied from a power source module to a pulse voltage signal by a switching operation; and,
a wireless power transmitting module including at least one power transmitter receiving the pulse voltage and transmitting power to at least one power receiver,
wherein the wireless power transmitting module controls the power, which is transmitted to the at least one power receiver depending on required power of the at least one power receiver,
wherein the at least one power transmitter comprises a resonance tank transmitting power to the at least one power receiver, and an enabling switch connected to the resonance tank in series, and a magnitude of a driving voltage as an input of the enabling switch is controlled depending on the required power,
wherein the required power is power to allow a load of the at least one power receiver to be charged up to a targeted voltage gain.

2. The wireless charging system of claim 1, wherein the wireless power transmitting module further comprises:
a first processor controlling the power transmitted from the power transmitter depending on the required power, and
wherein the first processor controls a voltage of the resonance tank included in the power transmitter to control the power transmitted to the power receiver.

3. The wireless charging system of claim 2, wherein the first processor determines a frequency of a driving signal of the inverter depending on the required power and controls a switching operation of the inverter based on the driving frequency.

4. The wireless charging system of claim 3, wherein the number of the power receiver is equal to or more than two, and the first processor detects a maximum power among required powers of the power receivers and determines the frequency of the driving signal for controlling the switching operation of the inverter based on the maximum power.

5. The wireless charging system of claim 1, wherein the resonance tank is configured to include a transmitting inductor and a transmitting capacitor which are connected to each other in series.

6. The wireless charging system of claim 1, wherein the enabling switch is a metal oxide semiconductor field effect transistor (MOSFET).

7. The wireless charging system of claim 2, wherein the number of the power transmitter is equal to or more than two, the number of the power receiver is equal to or more than two, each of the power transmitters transmits power to one corresponding power receiver of the power receivers, and the first processor controls the voltage of the resonance tank of each of the power transmitters by controlling the magnitude of the driving voltage of the enabling switch of each of the power transmitters depending on the required power of the power receiver corresponding to each of the power transmitters.

8. The wireless charging system of claim 7, wherein the inverter includes a first switch and a second switch which are electrically connected to each other and are alternately operated, and
the power transmitters are connected to each other in parallel, and the second switch is connected to the power transmitters in parallel.

9. The wireless charging system of claim 8, wherein the first and second switches are a metal oxide semiconductor field effect transistor (MOSFET).

10. The wireless charging system of claim 8, wherein the first processor determines a frequency of a PWM signal for controlling an operation of the first switch and the second switch of the inverter based on a maximum power among targeted powers of the power receivers.

11. A method for controlling a wireless charging system including a wireless power transmitting module including an inverter and at least one power transmitter comprising a resonance tank transmitting power to at least one power receiver and an enabling switch connected to the resonance tank in series, comprising:
a required power receiving step of receiving required power of the at least one power receiver;
a driving frequency determining step of determining a frequency of a driving signal of the inverter based on the required power; and
a transmitting power controlling step of controlling power, which is transmitted to the power receiver by controlling a magnitude of a driving voltage as an input of the enabling switch depending on the required power, wherein the required power is power to allow a load of the at least one power receiver to be charged up to a targeted voltage gain.

12. The method of claim 11, wherein the number of the power transmitter is equal to or more than two, the number of the power receiver is equal to or more than two, and each of the power transmitters transmits power to one corresponding power receiver of the power receivers, wherein the transmitting power controlling step controls the magnitude of the driving voltage of the enabling switch of each of the power transmitters depending on required power of the power receiver corresponding to each of the power transmitters.

13. The method of claim 11, wherein the transmitting power controlling step continuously performs the voltage control of the driving signal if it is determined that an output power of the power receiver is less than the required power and ending the voltage control of the driving signal if it is determined that the output power of the power receiver is equal to or more than the required power, by comparing between the output power and the required power.

14. The method of claim 11, wherein the enabling switch is a metal oxide semiconductor field effect transistor (MOSFET).

15. The method of claim 11, wherein the number of the power receiver is equal to or more than two, the power receivers are connected to each other in parallel, and the inverter applies an input voltage to the power receivers, wherein the driving frequency determining step includes:

a step of calculating a maximum power among required powers of the power receivers; and a step of determining the frequency of the driving signal for controlling an operation of a first switch and a second switch of the inverter based on the maximum power.

16. The method of claim 15, wherein the first and second switches of the inverter are a metal oxide semiconductor field effect transistor (MOSFET), and the driving signal is a pulse width modulation (PWM) signal for operating the MOSFET.

* * * * *